United States Patent [19]

Murty

[11] 4,144,193

[45] Mar. 13, 1979

[54] GRANULAR ACTIVATED CARBON MANUFACTURE FROM SUB-BITUMINOUS COAL TREATED WITH DILUTE INORGANIC ACID

[75] Inventor: Hari N. Murty, Grand Island, N.Y.

[73] Assignee: The Carborundum Company, Niagara Falls, N.Y.

[21] Appl. No.: 884,084

[22] Filed: Mar. 6, 1978

Related U.S. Application Data

[63] Continuation-in-part of Ser. No. 818,700, Jul. 25, 1977, abandoned, which is a continuation-in-part of Ser. No. 578,061, May 16, 1975, abandoned.

[51] Int. Cl.$^2$ .................... B01J 21/18; C01B 31/12; C01B 31/10
[52] U.S. Cl. .................... 252/444; 252/422; 252/423; 423/449
[58] Field of Search ............... 252/421, 422, 423, 444, 252/445; 423/445, 449, 460, 461

[56] References Cited

U.S. PATENT DOCUMENTS

| | | | |
|---|---|---|---|
| 3,483,134 | 12/1969 | Olson | 252/421 |
| 3,623,999 | 11/1971 | Jungten | 252/421 |
| 3,876,505 | 4/1975 | Stoneburner | 201/8 |
| 3,998,604 | 12/1976 | Hinkley | 44/1 R |
| 4,014,817 | 3/1977 | Johnson et al. | 252/445 |
| 4,039,473 | 8/1977 | Shaffer | 252/425 |
| 4,083,801 | 4/1978 | Das | 252/422 |

FOREIGN PATENT DOCUMENTS

906754  8/1972  Canada .................... 252/444

Primary Examiner—Winston A. Douglas
Assistant Examiner—P. E. Konopka
Attorney, Agent, or Firm—David E. Dougherty; Robert C. Weber

[57] ABSTRACT

Granular activated carbon is manufactured from sub-bituminous coal by crushing and screening the as received coal containing about 10 to about 25% moisture by weight to produce 8/30 mesh granules, treating the granules with a dilute aqueous solution of inorganic acid at a concentration from about 1 to about 25% by weight to reduce the volatile content and thereby increase the fixed carbon content, the particular concentration being selected to provide the desired activity and porosity of the activated carbon, comprising: mixing the granules with the acid, washing off the acid, and drying the granules at least partially to a moisture content below about 25% by weight. The granules are mixed with from 0 to about 15% by weight of coal tar pitch. The so treated granules are ground to form fine powder of not less than about 60% by weight −325 mesh, preferably more than about 65% by weight −325 mesh, which is compressed into shapes, such as pellets or thin corrugated sheets under high pressure, and then granulated to reform 6/20 mesh granules. These reformed granules are devolatilized, without prior charring, by directly heating to and at a temperature higher than the charring temperature in an oxygen-free atmosphere, and then activated by heating to and at a temperature higher than the devolatilizing temperature in an atmosphere containing a gaseous activating agent.

27 Claims, 1 Drawing Figure

GRANULAR ACTIVATED CARBON MANUFACTURE FROM SUB-BITUMINOUS COAL TREATED WITH DILUTE INORGANIC ACID

This application is a continuation-in-part of Ser. No. 818,700, filed July 25, 1977 which is a continuation-in-part of Ser. No. 578,061, filed May 16, 1975, both now abandoned.

BACKGROUND OF THE INVENTION

1. Field of the Invention

This invention relates to granular activated carbon manufacture, and more particularly to a new and improved process for making granular activated carbon from sub-bituminous coal treated with dilute inorganic acid, and to a new and improved granular activated carbon made by such process and having properties which make it suitable for use in water and waste water treatment and in other applications including gas and air purification.

GLOSSARY OF TERMS

In order to facilitate a clear understanding of this invention, various terms of art employed herein are defined as follows.

Abrasion number — is a measure of the resistance of the activated carbon granules to degrading on being mechanically abraded. It is measured by contacting a sample with steel balls in a pan on a machine and shaking the contents for a given time and determining the resultant particle size distribution and hence the mean particle diameter. The abrasion number is the ratio of the final average (mean) particle diameter to the original average (mean) particle diameter (determined by screen analysis) times 100.

Activated carbon — is carbon which is "activated" by heating to high temperature preferably with steam or carbon dioxide as the gaseous activating agent in producing an internal porous particle structure.

Activation or activating — means heating coal at high temperature on the order of about 600° C. to about 1000° C. in the presence of a gaseous activating agent, as is well known in the art. The heating rate during activation from the minimum activation temperature to the maximum activation temperature may vary widely, e.g., from about 100° to about 1000° C. per hour, but usually is nearer 100° C. per hour.

Adsorption isotherm — is a measurement of the adsorptive capacity of an adsorbent (viz. granular activated carbon) as a function of the concentration, or pressure, of the adsorbate (viz. $N_2$) at a given temperature. It is defined as the constant temperature relationship between the amount adsorbed per unit weight of adsorbent and the equilibrium concentration, or partial pressure.

Apparent density — is the weight per unit volume of homogenous granular activated carbon. To assure uniform packing of the granules during measurement, a vibrating trough is used to fill the measuring device.

Ash — is a principal mineral constituent of coal, carbon and pitch. It is normally defined as a weight percent basis after a given amount of sample is reduced to ash.

Average (mean) particle diameter — is a weighted average diameter of a granular activated carbon sample. A screen analysis is run and the average particle diameter is calculated by multiplying the weight of each fraction by its average diameter, adding the products, and dividing by the total weight of the sample. The average diameter of each fraction is taken as the size midway between the sieve opening through which the fraction has passed and the sieve opening on which the fraction was retained. It usually is expressed in mm.

Carbon tetrachloride activity number — is the steady state percentage increase in the weight of a bed of activated carbon after air which has been saturated with carbon tetrachloride at 0° C. is passed through the carbon at 25° C. It is expressed as a percentage number.

Charring — means heating coal at low temperatures on the order of about 175° C. to about 275° C. in the presence of oxygen.

Coking value — is usually expressed as percent residual carbon obtained when a dry sample of coal, tar or pitch is vaporized or pyrolyzed for a specific time at a specific temperature that limits the available oxygen supply (ASTM Method D-2416). The coking value, expressed as percent residual carbon, indicates the coke forming properties of the material.

Devolatilizing — means heating coal at intermediate temperatures on the order of about 400° C. to about 600° C. in an oxygen-free atmosphere.

Granular activated carbon — is "activated carbon" which has a particle size, i.e., "mesh", which is not less than about 40 and preferably not less than about 60.

Iodine number — is the milligrams of iodine adsorbed by one gram of granular activated carbon at an equilibrium filtrate concentration of 0.02 N iodine. It is measured by contacting a single sample of carbon with an iodine solution and extrapolating to 0.02 N by an assumed isotherm slope. This number can be correlated with the ability of granular activated carbon to adsorb low molecular weight substances.

Mesh — (or mesh size) is the particle size of granules as determined by the U.S. Sieve Series or the Tyler Series. Usually, this term refers to the sizes of the two screens, in either of the above Series, between which the bulk of a sample falls. For example, "8/30 mesh" (or "8 by 30 mesh" or "8 × 30 mesh") means that 90% by weight of the sample will pass through a No. 8 screen but will be retained on a No. 30 screen. Alternatively, this term refers to a maximum particle size, such as in defining the fineness of powder material. For example, "65% by weight — 325 mesh powder" means that 65% by weight of a given sample passes through a No. 325 mesh screen.

Molasses number — is calculated from the ratio of the optical densities of the filtrate of a molasses solution treated with a standard activated carbon and the activated carbon in question.

Pitch — is a black or dark viscous substance obtained as a residue in the distillation of organic materials and especially tars.

Powder — means powdered activated carbon which has a particle size, i.e., "mesh", which is smaller than about 40 and preferably smaller than about 60. The larger the mesh number, the smaller the size.

Sub-bituminous coal — is an intermediate stage coal which ranks above lignite and brown coals, but below bituminous coal. In the as received condition it has, by weight, (1) a proximate analysis of: from about 10% to about 25% moisture, from about 35% to about 45% volatile material, from about 2% to about 5% ash, and from about 25% to about 45% fixed carbon, and (2) an ultimate analysis of: from about 65% to about 75% carbon, from about 4% to about 8% hydrogen, from about 0.5% to about 2.0% nitrogen, and from about 0.5% to about 1.0% sulfur. See ASTM Standard D-388-66.

Surface area — is the amount of surface area per unit weight of granular activated carbon; it is determined from the nitrogen adsorption isotherm by the Brunauer, Emmett and Teller (BET) method, and it is espressed in m$^2$/gram.

2. Prior Art

Granular activated carbon is particularly useful in water and waste water treatment not only because it is highly effective in purifying the intake, as well as the effluent from municipal and industrial systems but also because it can be regenerated for repeated use. However, in order to accomplish these objectives it must possess certain properties, namely, a minimum surface area of about 900 m$^2$/gram for adequate adsorption capacity, a minimum Iodine number of about 900 for adequate adsorption of low molecular weight substances, a minimum Molasses number of about 200 for adequate decolorizing, a maximum ash content (by weight) of not more than about 12%, and preferably not more than about 8%, for purity, a minimum abrasion number of about 70 and preferably not less than about 80, for adequate hardness in maintaining granular integrity in use and in regeneration, and a minimum apparent density of not less than about 0.46 gram/cc, preferably not less than about 0.48 gram/cc, for obtaining the dense, closely packed beds and columns needed in water and waste water treatment. Granular activated carbon also is useful for gas and air purification applications. In such applications the Iodine number should not be below a minimum of about 1000 and the Molasses number should be less than 200, more preferably an Iodine number of about 1050 and a Molasses number of about 180, and a minimum carbon tetrachloride number of about 50, more preferably about 60.

These properties can be obtained by making granular activated carbon from bituminous coal, but until the present invention it is not known that anyone else has accomplished this by dilute inorganic acid treatment of sub-bituminous coal, which is considerably cheaper, as the starting material, without charring before devolatilization and activation.

Moreover, when so using bituminous coal, it has been found herein necessary not only to mix in pitch but also to char the granulated mixture prior to the devolatilizing and activating steps. Otherwise, because of the high coking tendency of the preferred bituminous coals, the granules fuse together during devolatilization and are thereby rendered unsuitable both for proper activation and for obtaining the aforesaid desired properties. Likewise, in the present work herein, it has been found that this charring step is necessary, whether or not the granules have been treated with a dilute aqueous solution of inorganic acid prior to the pitch addition and charring, and that such acid treating has little, if any, beneficial effect upon either the overall yield of the resulting granular activated carbon or the aforesaid properties desired.

Furthermore, it has been found herein that granular activated carbon of the aforementioned properties can not be produced from sub-bituminous coal when such coal is not subjected to such dilute acid treatment or charring, despite the fact that such coal usually is not well coking. Although it has been found herein that sub-bituminous coal can be charred, without such dilute acid treatment, to produce granular activated carbon, the yield is very low and the properties, at best are borderline or below the minimum acceptable for granular activated carbon suitable for use in waste water treatment and other applications. As a matter of fact, it has been found herein that the charring step, originally thought necessary for so processing sub-bituminous coal, can be eliminated, and that if appropriate dilute inorganic acid treatment is employed, this results in significant increases not only in yield, but also in the desired properties. In addition, it has been found herein that, while a combination of dilute inorganic acid treatment and carbonaceous binder such as pitch addition make for optimum yield and properties, the carbonaceous binder can be eliminated entirely and still produce a significantly increased yield, as well as acceptable properties.

This charring or oxidation step also was considered essential in making activated carbon not only from bituminous coal, as disclosed in Olson U.S. Pat. No. 3,483,134, but also from bituminous, sub-bituminous or lignite coal, as disclosed in Stoneburner U.S. Pat. No. 3,876,505. The Johnson et al U.S. Pat. No. 4,014,817 disclosed an improvement on the process in U.S. Pat. No. 3,876,505, which improvement comprised acid washing of the coal prior to carrying out the manufacturing method, but still required the oxidizing step. Moreover, none of these patents discloses a hard granular activated carbon product.

SUMMARY OF THE INVENTION

Accordingly, a general primary objective of the present invention is (1) to provide a new and improved process for making granular activated carbon from lower cost sub-bituminous coal instead of higher cost bituminous coal, and wherein the charring step necessary for processing bituminous coal is eliminated, while the overall yield of granular activated carbon is increased significantly by appropriate treatment of sub-bituminous coal by treating with a dilute aqueous solution of inorganic acid, with or without the addition of carbonaceous binder; (2) as well as to provide a new and improved hard granular activated carbon made by such process and having the aforementioned desired properties of adsorption (as measured by surface area and Iodine number), decolorization (as measured by Molasses number), gas and air purification (as measured by the carbon tetrachloride number), purity (as measured by ash content), hardness (as measured by abrasion number) and density (as measured by apparent density), which make it suitable for use in water and waste water treatment and in other applications including gas and air purification. To this end, the invention includes (1) a process for making hard granular activated carbon suitable for use in water and waste water treatment and in other applications such as gas and air purification, comprising: forming granules from sub-bituminous coal; treating the granules with a dilute aqueous solution of inorganic acid to reduce the volatile content and thereby increase the fixed carbon content comprising: mixing the granules with the acid, washing off the acid, and drying the granules at least partially to a moisture content below about 25% by weight; mixing the treated granules with 0 to about 15% by weight of a carbonaceous binder such as pitch; reducing the treated granules to form fine powder; compressing the powder to form shapes; reducing the shapes to reform granules; devolatilizing the reformed granules, without charring, by directly heating to and at a temperature higher than the charring temperature in an oxygen-free atmosphere; and activating the devolatilized granules by heating to and at a temperature higher than the devolatilizing temperature in an atmosphere containing a gaseous activating agent; and (2) hard granular activated carbon made by such process and having the physical characteristic of high granular integrity permitting repeated handling, use, regeneration and reuse. The shapes may be of various configurations larger than the granules such as pellets, briquettes, thin sheets of corrugated cross-section, etc.

A specific primary objective is to provide (1) such process wherein granules are formed from sub-bituminous coal having a moisture content of not more than about 25% by weight, preferably about 10 to about 25% by weight, and an ash content of not more than about 5% by weight, preferably about 2% by weight; the acid may be any suitable inorganic acid including $H_2SO_4$, $H_3PO_4$, HCl, $HNO_3$ and other oxy acids of Sulphur, Phosphorous, Chlorine and Nitrogen, and mixtures thereof, the preferred acid is $H_3PO_4$, and the acid concentration is from about 1 to about 25% by weight; the treated granules are reduced to powder of not less than about 60% by weight −325 mesh, preferably of more than about 65% by weight −325 mesh, and more preferably about 75 to about 85% −325 mesh; the powder is compressed or compacted to form shapes under a pressure of about 40,000 psi or more, or the powder is continuously compressed to form shapes and the fines are recycled; the reformed granules are devolatilized by heating to a temperature of about 400° C. to about 600° C. at a rate of about 50° C. to about 300° C. per hour for a time of about ½ hour to about 3 hours; and the devolatilized granules are activated by heating to a temperature of about 600° C. to about 1000° C. for a time of about 1 hour to about 6 hours; in order to produce an overall yield of granular activated carbon of not less than about 25%, preferably not less than about 30% by weight, dry basis; and (2) such granular activated carbon made by such process and having a surface area of not less than about 900 m²/gram, preferably not less than about 1000 m²/gram; an Iodine number of not less than about 900, preferably not less than about 1000; an ash content, by weight, of not more than about 12%, preferably not more than about 8%, and more preferably not more than about 7% by weight; an abrasion number of not less than about 70, preferably not less than about 75, and more preferably not less than about 80, an apparent density of not less than about 0.46 gram/cc, preferably not less than about 0.48 gram/cc; and a Molasses number of not less than about 200, preferably not less than about 220 for hard granular activated carbon suited for water and waste water applications, and for hard granular activated carbon suited for gas or air purification applications, in addition to the above properties, a low Molasses number, i.e., less than about 200, more preferably about 180 and a carbon tetrachloride number of at least about 50, more preferably about 60.

A further specific primary objective is to provide (1) such process wherein the acid concentration is relatively low, namely from about 1 to about 10% by weight, preferably from about 2 to about 5% by weight; and (2) such granular activated carbon made by such process and especially suited for water and waste water applications and having a 900 minimum Iodine number, 200 minimum Molasses number, more preferably, 950 Iodine number, 220 Molasses number or higher and an Abrasion number of at least 70 or higher.

A further specific primary objective is to provide (1) such process wherein the acid concentration is relatively high, namely from 10 to about 25% by weight, preferably from 10 to about 20% by weight; and (2) such granular activated carbon made by such process and especially suited for gas and air purification applications and having a minimum Iodine number of about 1000, a very low Molasses number, i.e., less than about 200, more preferably an Iodine number of about 1050 and Molasses number of about 180 and a minimum carbon tetrachloride number of about 50, more preferably about 60.

Another specific primary objective is to provide (1) such process wherein the granules after being washed to remove the acid are dried partially to a moisture content of about 10 to about 25% by weight, preferably about 15% by weight, with 0% addition of a carbonaceous binder; and the overall yield is not less than about 25% by weight, dry coal basis; and (2) such granular activated carbon made by such process and having a surface area of not less than about 900 m²/gram, an iodine number of not less than about 1000, an ash content of not more than about 7% by weight, an abrasion number of not less than about 70, and an apparent density of not less than about 0.46 gram/cc.

Still another specific primary objective is to provide (1) such pitchless process wherein the acid is $H_3PO_4$ and the overall yield is not less than about 26% by weight, dry coal basis; and (2) such granular activated carbon made by such process and having an ash content of not more than about 6% by weight, and an apparent density of not less than about 0.48 gram/cc.

Yet another specific primary objective is to provide (1) such process wherein the granules after being washed to remove the acid are dried at least partially to a moisture content below about 25% by weight, preferably from about 1 or 2% to slightly more than about 15%, and thereafter mixed with about 5 to about 15% by weight of carbonaceous binder such as pitch and the overall yield is not less than about 25% by weight, dry coal binder mixture basis; and (2) such granular activated carbon made by such process and having a surface area of not less than about 900 m²/gram, an Iodine number of not less than about 960, preferably not less than about 1000, an ash content of not more than about 7% by weight, an abrasion number of not less than about 75, preferably not less than about 80, and an apparent density of not less than about 0.47 gram/cc, preferably not less than about 0.48 gram/cc.

A further specific primary objective is to provide (1) such pitch process wherein the acid is $H_3PO_4$ at a concentration from about 2 to about 5% by weight and the overall yield is not less than about 30% by weight, dry coal binder mixture basis; and (2) such granular activated carbon made by such process and having a surface area of not less than about 1000 m²/gram, an Iodine number of not less than about 1000, an ash content of not more than about 6% by weight, an abrasion number of not less than about 75, preferably not less than about 80, an apparent density of not less than about 0.47 gram/cc, preferably not less than about 0.48 gram/cc, and a Molasses number of not less than about 215, preferably not less than about 240, thereby making it especially suited for water and waste water applications.

A still further primary specific objective is to provide (1) such process wherein the acid is $H_3PO_4$ at a concentration from 10 to about 20% by weight; and (2) hard granular activated carbon made by such process and having an Iodine number greater than 1100, an abrasion number of about 90, and apparent density of not less than about 0.47 gram/cc, a Molasses number of not more than about 195 and a carbon tetrachloride number of not less than about 65, thereby making it especially suited for gas and air purification applications.

Additional objectives and advantages of the invention will become apparent upon consideration of the following detailed description and accompanying drawing wherein:

DESCRIPTION OF THE PREFERRED EMBODIMENTS

In this detailed description, reference will be made to fourteen Examples, of which Examples 1 and 6-8 relate to and provide background for the present invention, while Examples 2-5 and 9-14 are illustrative of the invention per se. Moreover, the order or sequence of the Examples has been selected in order to show a progression in experimentation from Example 1, which represents an attempt to apply a known charring technique for making granular activated carbon from bituminous coal to sub-bituminous coal; through the inventive dilute acid treatment techniques of Examples 2-5; to Examples 6 and 7 which compare the results obtained by attempting to superimpose an inventive acid treatment technique (Example 7) on a known charring technique (Example 6) for making granular activated carbon from bituminous coal; to Example 8, which shows that an inventive dilute acid treatment technique does not work as well for lignite, and finally to inventive Examples 9-14, which respectively show the importance of fineness of grinding in powderizing (Example 9), the workability of HCl (Example 10) along with $H_2SO_4$ (Example 4) and $H_3PO_4$ (Example 5), the beneficial effect of dilute acid treatment on sub-bituminous coal in reducing volatile content and increasing fixed carbon content (Example 11), the workability of the inventive process on a larger scale (Examples 12 and 13), and the workability of the inventive process in effectively producing hard granular activated carbon especially suited for gas and air purification applications (Example 14).

EXAMPLE 1

CHARRING OF SUB-BITUMINOUS COAL IN MAKING GRANULAR ACTIVATED CARBON

In making granular activated carbon from bituminous coal it has been found necessary to char the coal granules prior to activation, as will be seen below in Examples 6 and 7. Thus, this technique was adopted in order to see what sort of product could be so obtained from sub-bituminous coal. The starting material for this and each of the ensuing Examples 2-5 and 9-11 was a batch of Wyoming sub-bituminous coal having the following analyses, % by weight in the as received and dry conditions:

| Proximate Analysis | | | Ultimate Analysis | |
|---|---|---|---|---|
| | As Received | Dry | | Dry |
| Moisture | 17 | — | Carbon | 69.8 |
| Volatile Material | 44 | 53 | Hydrogen | 5.4 |
| Ash | 2.05 | 2.48 | Nitrogen | 0.9 |
| Fixed Carbon | 35 | 42.20 | Sulfur | 0.55 |

These analyses are, in general, typical of a sub-bituminous coal. The as received coal was crushed to a very fine size such that more than 65% by weight of the material passed through 325 mesh screen, preferably 75 to 85% −325 mesh. The powder was pressed at 40,000 to 80,000 psi pressure into cylindrical pellets approximately ½ inch high and ½ inch diameter. The apparent density of these pellets was in the range of 1.1 to 1.2 grams/cc. The pellets then were granulated to obtain granules of 6 by 20 mesh with an apparent density in the range of 0.64 to 0.68 gram/cc. In the course of experimentation, as will be seen from Examples 2 and 3, it was found that to obtain compact granules (suitable for obtaining hard granular activated carbon) without the use of a carbonaceous binder such as coal tar pitch, the moisture content of the sub-bituminous coal and the treated granules is important. For the treated granules, too low a moisture content, i.e., below about 10% by weight, or too high a moisture content, i.e., above about 25% by weight, led to poor compaction, and hence reformed granules that were not hard and dense. Likewise, if the moisture content of the coal is too great, i.e., more than about 25% by weight, in the as received condition, for example as the result of a rainstorm, it preferably is dried, before granulating, to the desired moisture content range of about 10 to about 25% by weight. Otherwise, crushing and screening are unduly difficult because of gumming. On the other hand, in the unlikely event that the coal is too dry, as received or otherwise, i.e., below about 10% by weight, it preferably is wetted to such desired moisture content range, because of undesirable dusting during crushing and screening. In this Example and in the inventive Examples, the about 17% by weight content of the as received coal was well within the prescribed limits, and hence no drying or wetting was necessary, in the first instance.

600 grams of the granules obtained according to the procedure described above were loaded into a cylindrical container prepared from 5 mesh screen. The container was mounted onto a cylindrical shaft and the assembly was loaded into a cylindrical furnace so that the container and the granules therein were rotated slowly and uniformly inside the furnace.

The granules there were subjected to a charring treatment wherein the granules were heated in an atmosphere of air and nitrogen (deficient oxygen) to 200° C. at the rate of 100° C. per hour, and maintained at this temperature for 1 hour. During this process, the granules were slowly and uniformly rotated (1 to 8 rpm) so that they were exposed to the oxidizing action of $O_2$ present. During the course of experimentation, it was found that higher temperatures and/or higher oxygen content in the atmosphere led to poor process control and eventually a poor product. The loss of weight in the charring step was in the range of 5 to 10% by weight based on the dry coal.

The granular material then was subjected to a devolatilization process. The granules were loaded into the furnace described above and heated to 450° C. at the rate of 300° C./hour in an atmosphere free from oxygen (in the present case an atmosphere composed of $N_2$ and the volatiles given off by the granules), and maintained at the devolatilizing temperature for 1 hour and then cooled. During the course of experimentation it was learned that the charring and devolatilization steps could be carried out sequentially without cooling down, provided the atmosphere was altered such that it was nearly free of oxygen during heat up beyond 200° C. It also was learned that the presssure of oxygen at these higher temperatures led to higher losses, poorer yield of product and inferior granular product.

The yield of granules after devolatilization was about 60% by weight based on charred granules, and their apparent density was about 0.6 gram/cc.

Next, the devolatilized granules were loaded into a cylindrical furnace and were subjected to activation by heating the granules to 800° to 900° C. in an atmosphere composed of a carrier gas of $N_2$ and steam and by maintaining the granules at the activating temperature for 4 to 5 hours. The amount of steam fed in was pre-determined such that it amounted to 1 to 3 grams of steam/gram of charge/hour.

The yield of granular activated carbon from this step was in the range of 30 to 40% by weight based on devolatilized material. The granular product had a surface area of 900 to 1000 $m^2$/gram, an ash content in the range of 7 to 10% by weight, an abrasion number of 60 to 70 and an apparent density in the range of 0.45 to 0.48 gram/cc.

The overall yield based on dry coal was 20 to 22% by weight and the granules had adsorption properties, ash, density and hardness which were below or on the borderline in being acceptable as a granular activated carbon for use in waste water treatment and other applications. During the course of experimentation, it was learned that if the sub-bituminous coal was processed as above, but without the charring step, the resultant product was soft and had little activity, thus indicating the importance of charring the sub-bituminous coal (when processed by itself), even though such a coal is not very highly coking.

Figure 1:
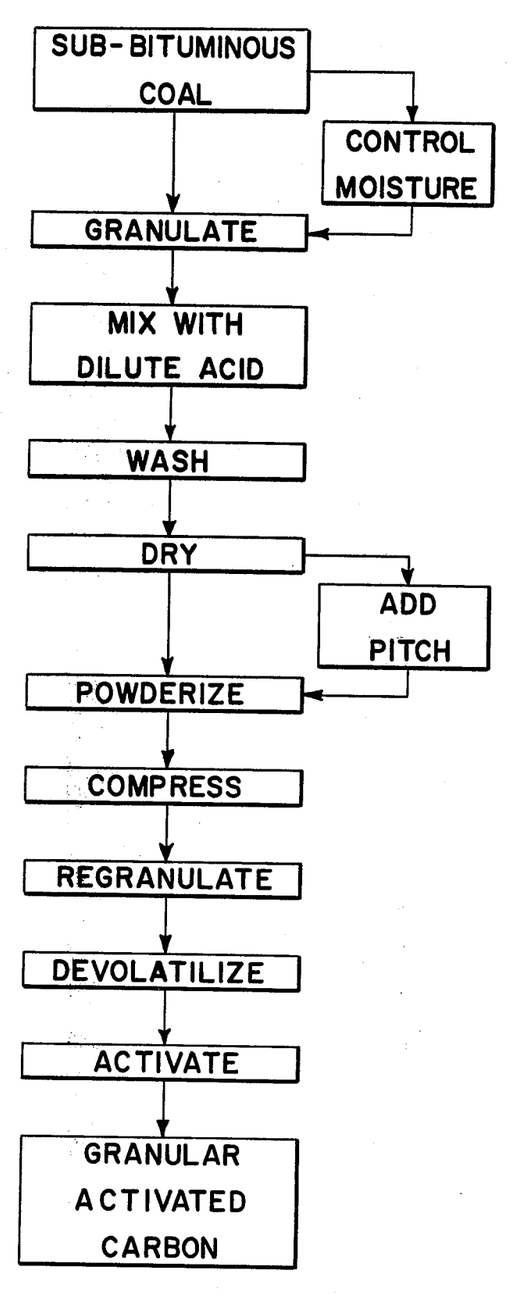
The single FIGURE is a block diagram or flow sheet illustrating schematically the various steps of the process, as well as the resulting product, both embodying the invention.

The following Examples 2-5 and 9-14 represent preferred embodiments of the present invention, which is represented schematically in the drawing. Thus, from a method standpoint, the inventive process generally includes the steps of granulating the sub-bituminous coal, which either has, in the as received condition, the proper moisture content range of about 10 to about 25% by weight, or is dried or wetted, as shown at the upper right of the drawing, to so control such moisture content prior to granulating; followed by the steps of treating the granules with a dilute aqueous solution of inorganic acid to reduce the volatile content and thereby increase the fixed carbon content comprising: mixing the granules with the acid, washing off the acid and drying the granules at least partially to a moisture content below about 25% by weight; mixing the treated granules with from 0 to 15% by weight of a carbonaceous binder such as pitch; powderizing; compressing; regranulating; devolatilizing, without charring; and activating; all in order to produce the desired inventive product of granular activated carbon which is acceptable for use in water and waste water treatment and in other applications including gas and air purification.

Examples 2 and 3 represent two preferred embodiments of such treatment wherein the granules are treated with dilute aqueous solutions of $H_2SO_4$ and $H_3PO_4$ respectively, and after being washed to remove the acid are dried partially to the above noted proper moisture content range, actually to about 15% by weight, followed directly by powderizing, etc., with 0% addition of a carbonaceous binder such as pitch, as shown in the drawing. Examples 4 and 5 represent two different and more preferred embodiments of such treatment wherein the granules are treated with dilute aqueous solutions of $H_2SO_4$ and $H_3PO_4$ respectively, as noted above, except that the granules are dried to a moisture content below about 15% by weight, actually about 3% by weight, and thereafter mixed with about 5 to about 15% by weight, actually about 10% by weight of a carbonaceous binder such as pitch, prior to powderizing, etc., as shown at the middle right side of the drawing.

EXAMPLE 2

DILUTE $H_2SO_4$ TREATED SUB-BITUMINOUS COAL GRANULES (WITHOUT PITCH) IN MAKING GRANULAR ACTIVATED CARBON

A batch of Wyoming sub-bituminous coal having the analyses described in Example 1 was crushed and screened to obtain 8 × 30 mesh granules. 300 grams of the granules were loaded into a 4 liter kettle, and a dilute aqueous acid solution consisting of 150 cc. of 98% concentrated $H_2SO_4$ and 2850 cc. of water was added to the granules (about 8.8% acid, by weight. The granules and the acid solution were heated to 80° C. and maintained at this temperature for 5 hours, while the granules were continuously stirred. During the course of experimentation, it was learned that size of granules, temperature of treatment (which is usually below 100° C. because of the use of the dilute aqueous acid solution), time of treatment, concentration of acid, and the ratio of dilute aqueous acid solution to coal all have important effects on further processibility of the coal to form granular activated carbon. Therefore, the specific numbers cited in this and the ensuing inventive Examples are merely illustrative and not restrictive. For example, both coarser and finer granules can be employed during treatment with corresponding results, with the time of treatment being longer for coarser particles and shorter for finer particles.

The contents of the slurry were allowed to cool, the solution decanted, and the granules were thoroughly rinsed such that wash water off the granules analyzed to a pH of 6 to 7. To complete the treatment, the washed granules were dried partially to an approximate moisture content of 15%, which is that preferred for good compaction in forming the pellets and hard, dense granules therefrom, without the use of a carbonaceous binder such as pitch.

The treated granules containing roughly 15% by weight of moisture were milled into a very fine powder such that more than 65% by weight of the material passed through 325 mesh screen, preferably 75 to 85% −325 mesh, as explained in Example 9 below. The powder was pressed into cylindrical pellets of ½ inch diameter and ½ inch high using a pressure of 40,000 to 80,000 psi, the apparent density of the pellets being in the range 1.1 to 1.2 grams/cc. These pellets were regranulated to obtain 6 × 20 mesh granules having an apparent density of 0.64 to 0.68 gram/cc. The reformed granules were loaded into a cylindrical furnace and devolatilized as described in Example 1, but without charring, which devolatilization consisted of directly heating the granules to 450° C. at 300° C./hour in an atmosphere free of oxygen and holding at temperature for 1 hour. This devolatilization step can be varied such as by using a heating rate of about 50° C. to about 300° C. per hour to a final temperature of about 400° C. to about 600° C., with the time at temperature ranging from about ½ to about 3 hours, in an inert atmosphere.

During the course of experimentation it was learned that the charring step described in Example 1 is not necessary to make hard and adsorptive granular activated carbon. Two batches of identical material, treated in dilute aqueous acid solution as described above, were processed, one with a charring step and the other without. While the yields in specific process steps varied, the overall yield and activity of the granular activated carbon product were the same, indicating that the charring step can be eliminated for this material. This presumably was a result of the coal being subjected to the dilute aqueous acid solution treatment.

The devolatilized granules which had an apparent density of 0.60 gram/cc, were loaded into a cylindrical furnace and subjected to activation by heating the granules to 800 to 900° C. in an atmosphere composed of $N_2$ and steam, and by maintaining the granules at this temperature for 4 to 5 hours. The amount of steam fed into a furnace was precalibrated such that it amounted to 1 to 3 grams of steam/gram of charge/hour. This activation step can be varied, such as by using a heating rate of about 100° C. to about 1000° C. per hour to a temperature of about 600° C. to about 1000° C., with the time ranging from about 1 hour to about six hours in an atmosphere containing one or more gaseous activating agents such as $CO_2$, air and steam.

The resulting overall yield of granular activated carbon, based on dry coal, was in the range of 25 to 28% by weight versus 20-22% for Example 1. The granules had a surface area of 900 to 1100 $m^2$/gram, as compared to 900 to 1000 for Example 1, an Iodine number of 1000, an ash content of 5 to 6% by weight, as compared to 7 to 10% for Example 1, an abrasion number of 70 as compared to 60-70 for Example 1, and an apparent density of 0.46 to 0.48 gram/cc, as compared to 0.45 to 0.48 for Example 1.

Thus, these granules were hard, very adsorptive, low in ash and in most respects comparable to the grades of granular activated carbon preferred for use in water and waste water treatment and in other applications. Further, it is to be noted that not only can an acceptable granular activated carbon product be made from sub-bituminous coal without the use of any carbonaceous binder such as coal tar pitch, and without charring, but also that treatment with dilute aqueous acid solution significantly increases yield and adsorption while also reducing ash content, all as compared to Example 1. It also is noteworthy that a hard granular activated carbon possessing high granular integrity permitting repeated handling, use, regeneration and reuse was prepared from sub-bituminous coal for the first time without the use of a carbonaceous binder, and without charring prior to devolatilization and activation.

EXAMPLE 3

DILUTE $H_3PO_4$ TREATED SUB-BITUMINOUS COAL GRANULES (WITHOUT PITCH) IN MAKING GRANULAR ACTIVATED CARBON

A batch of Wyoming-bituminous coal having the analyses described in Example 1 was crushed and screened to obtain 8 × 30 mesh granules, 300 grams of which were loaded into a 4 liter kettle. A dilute aqueous acid solution consisting of 150 cc of 75% concentrated $H_3PO_3$ and 2850 cc of water was added to the granules (about 7.6% by weight). The granules and the acid solution were heated to 80° C. and maintained at this temperature for 5 hours, while the granules were continuously stirred. The contents were allowed to cool, the solution decanted, and the granules were thoroughly rinsed such that wash water off the granules analyzed to a pH of 6 to 7. To complete the treatment, the washed granules were dried partially to an approximate moisture content of 15%, as in Example 2.

The treated granules containing roughly 15% by weight of moisture were milled into a very fine powder such that more than 65% by weight of the material passed through 325 mesh screen (65% by weight −325 mesh), preferably 75 to 85% −325 mesh.

The powder was pressed into cylindrical pellets of ⅛ inch diameter and ¼ inch long using a pressure of 40,000 to 80,000 psi, and the apparent density of the pellets was in the range 1.1 to 1.2 grams cc. The pellets were regranulated to obtain 6 × 20 mesh granules which had an apparent density of 0.58 to 0.62 gram/cc.

The reformed granules were loaded into a cylindrical furnace and devolatilized as described in Examples 1 and 2, but with no charring being necessary prior to such devolatilization. The devolatilized granules, which had an apparent density of 0.58 to 0.60 gram/cc, were activated in the manner also set forth in Examples 1 and 2.

The overall yield of granular activated carbon, based on the dry coal was in the range of 26 to 30% by weight, versus 20 to 22% for Example 1 and 25 to 28% for Example 2. The granules had a surface area of 900 to 1100 $m^2$/gram, versus 900 to 1000 for Example 1, an Iodine number of 1000, an ash content of 5 to 6% by weight, as compared to 7 to 10% for Example 1, an abrasion number of 70, as compared to 60 to 70 for Example 1, and an apparent density of 0.48 to 0.50 gram/cc. as compared to 0.45 to 0.48 for Example 1 and 0.46 to 0.48 for Example 2. The yield and apparent density properties were slightly higher than those observed in Example 2 ($H_2SO_4$).

Thus, the resulting granules were hard, very adsorptive, low in ash, and in most respects comparable to the grades of granular activated carbon preferred for use in water and waste water treatment and in other applications. It is to be noted once again that an acceptable product can be made from sub-bituminous coal without a carbonaceous binder and without charring, and that treatment with dilute aqueous acid solution significantly increases yield and adsorption, while also reducing ash content, as compared to Example 1. As for using $H_2SO_4$ or $H_3PO_4$ as the acid in the aqueous solution, $H_3PO_4$ is believed to be more effective in producing a granular activated carbon product with higher yield. As becomes evident, the exact amount of improvement in yield depends upon the specific acid treatment conditions and other process conditions employed.

EXAMPLE 4

DILUTE H₂SO₄ TREATED SUB-BITUMINOUS COAL GRANULES (WITH PITCH) IN MAKING GRANULAR ACTIVATED CARBON

The procedure of Example 2 was followed up to the drying step, but instead of drying partially to about 15% moisture the washed granules were dried to a moisture content of not more than about 1 or 2% by weight), and then as shown on the right side of the drawing, the treatment was completed by mixing the granules uniformly with a No. 125 coal tar pitch having the following properties:

| | | |
|---|---|---|
| Softening Point | 129.2° C. | |
| Benzene Insolubles | 33.2% | by weight |
| Quinoline Insolubles | 13.1% | by weight |
| Coking Value (Conradson) | 61.1% | by weight |
| Ash | 0.17% | by weight |

The thoroughly dried granules and pitch were mixed in the proportion of 90 grams coal and 10 grams pitch (i.e., 10 parts pitch per hundred parts coal pitch mixture, by weight), and this mixture milled into more than 65% by weight −325 mesh powder, was pressed into pellets of ½ inch diameter and ¼ inch high using a pressure in the range of 40,000 to 80,000 psi. The bulk density of the pellets was in the range 1.1 to 1.2 grams/cc, and they were granulated to obtain granules of 6/20 mesh and having an apparent density of 0.68 gram/cc.

600 grams of the granules were loaded into a cylindrical container and were devolatilized according to the procedure described in Example 2, without the charring step. The devolatilized granules had an apparent density of 0.62 grams/cc and a yield of 60% by weight based on the dry coal pitch mixture.

The devolatilized granules were loaded into a cylindrical furnace and subjected to activation as also set forth in Example 2.

The overall yield of granular activated carbon in this more preferred embodiment of the inventive process, based on the dry coal pitch mixture, was in the range of 25 to 30% by weight compared to 20 to 22% for Example 1. The granules had a surface area of 1050 m²/gram, as compared to 900 to 1000 for Example 1, an Iodine number of 1000 to 1100, as compared to 1000 for Examples 2 and 3, an ash content of 6% by weight, as compared to 7 to 10% for Example 1, an abrasion number of 80, as compared to 60 to 70 for Example 1, and 70 for Examples 2 and 3, and an apparent density of 0.48 to 0.50 gram/cc, as compared to 0.45 to 0.48 for Example 1 and 0.46 to 0.48 for Example 2.

Thus, the resulting granules were hard, very adsorptive, low in ash, and in all respects comparable to the grades of granular activated carbon preferred for use in waste water treatment and other applications. It is particularly noteworthy that, compared to the no acid and the charring approach of Example 1, the overall yield was considerably improved when the coal was subjected to treatment with a dilute aqueous acid solution, followed by mixing with pitch, with no charring, while at the same time yielding a product that was superior in adsorption properties, density and abrasion resistance. As for the H₂SO₄ acid no pitch procedure of Example 2, there was a slight increase in adsorption (Iodine number) and a significant increase in abrasion resistance and apparent density. With respect to the H₃PO₄ acid no pitch procedure of Example 3, there was a slight increase in adsorption (Iodine number) and a significant increase in abrasion resistance.

EXAMPLE 5

DILUTE H₃PO₄ TREATED SUB-BITUMINOUS COAL (WITH PITCH) MAKING GRANULAR ACTIVATED CARBON

The same procedure, as set forth in Example 4 was followed, except that 75% concentrated H₃PO₄ was substituted for the H₂SO₄ (making the acid about 7.6% by weight of the granules). The apparent density of the reformed compacted granules was 0.65 gram/cc instead of 0.68, while the devolatilized granules had an apparent density of 0.59 to 0.61 gram/cc instead of 0.62, and a yield of 60 to 65% by weight, based on the dry coal pitch mixture, instead of 60%.

The overall yield of granular activated carbon in this most preferred embodiment of the inventive process, based on the dry coal pitch mixture, was in the range of 30 to 33% by weight, as compared to 20 to 22% for Example 1, 25 to 28% for Example 2, 26 to 30% for Example 3, and 25 to 30% for Example 4. The granules had a surface area of 1050 m²/gram, as compared to 900 to 1000 for Example 1, an Iodine number of 1000 to 1100, as compared to 1000 for Examples 2 and 3, an ash content of 6% by weight, as compared to 7 to 10% for Example 1, an abrasion number of 80, as compared to 60 to 70 for Example 1, and 70 for Examples 2 and 3, and an apparent density of 0.48 to 0.50 gram/cc, as compared to 0.45 to 0.48 for Example 1 and 0.46 to 0.48 for Example 2.

Thus, the resulting granules were hard, very adsorptive, low in ash and in all respects comparable to the grades of carbon preferred for use in water and waste water treatment and in other applications. It is particularly noteworthy that the overall yield was considerably improved, not only over Example 1, but also over each of Examples 2, 3 and 4, with a substantial increase in adsorption, purity, abrasion resistance, and density over Example 1. Likewise, there was a significant increase in abrasion resistance over Examples 2 and 3, and a significant increase in density over Example 2.

This improved yield of hard, dense, adsorptive granular activated carbon, obtained by treating sub-bituminous coal with a dilute aqueous solution of H₃PO₄ is indeed an unexpected result over the art. Further, such improved yield is believed to be comparable to that obtainable from the higher valued bituminous coal, the traditionally preferred raw material. More importantly, such unexpected result is achieved by eliminating the charring step believed to be necessary in the use of the bituminous coal.

The next two Examples represent an endeavor to see what happens when bituminous coal is treated in accordance with the inventive process, first without dilute acid treatment (Example 6) and second with dilute acid treatment (Example 7).

EXAMPLE 6

USE OF BITUMINOUS COAL AND PITCH TO MAKE GRANULAR ACTIVATED CARBON

The starting material was a batch of eastern bituminous coal having the following analyses by weight:

| Proximate Analysis | | | Ultimate Analysis | | |
| --- | --- | --- | --- | --- | --- |
| | As Received | Dry | | As Received | Dry |
| % Moisture | 2.04 | — | % Moisture | 2.04 | — |
| % Ash | 1.20 | 1.26 | % Carbon | 82.30 | 84.00 |
| % Volatile Material | 33.10 | 33.80 | % H | 5.20 | 5.29 |
| % Fixed Carbon | 63.60 | 64.90 | % $N_2$ | 1.30 | 1.33 |
| | | | % S | 0.34 | 0.35 |
| BTU/lb. | 14,571 | 14,874 | % Ash | 1.23 | 1.26 |

These analyses are, in general, typical of eastern bituminous coals. These coals also are highly coking and low in ash content. The dried coal was crushed to obtain 8 × 30 mesh granules which were mixed with No. 125 coal tar pitch of the type described in Examples 4 and 5, and in the ratio of 90 grams of coal granules and 10 grams of pitch (10 parts per hundred by weight).

The mixture was milled into very fine powder so that 65% of the powder passed through 325 mesh screen. The milled powder was compressed into pellets ½ inch diameter and ½ inch high using a pressure of 40,000 to 80,000 psi. The pellets had a bulk density of 1.18 grams/cc and were granulated to obtain 6 × 20 mesh granules having an apparent density of 0.65 gram/cc.

600 grams of the granules were loaded into a cylindrical furnace and were subjected to the charring process substantially as described in Example 1. However, in this case, the charring consisted of heating the granules from room temperature to 250° C. at 100° C./hour and maintaining at temperature for 2 hours. An atmosphere of 0.5 standard cubic feet per hour at 1 atmosphere and room temperature (SCFH) of $N_2$ and 0.5 SCFH of air was fed into the furnace while the cylindrical container was rotating at 1 to 4 rpm.

In the course of experimentation it was found that heating rate, atmosphere (particularly the amount of oxygen present), temperature and time at temperature were critical variables that had an important influence on how the granules were suited for further processing in making hard granular activated carbon. For example, too small a time (less than ½ hour) at temperature or too low a temperature (lower than 200° C.), in general, led to difficulties in further processing of the granules. Thus, without proper charring, during the devolatilization step, the granules fused together and were unsuitable for proper activation and for obtaining the desired properties of granular activated carbon.

When properly charred, as described above, the yield of the granules was 69% by weight, based on the dry coal pitch mixture and they had an apparent density of 0.62 gram/cc.

The charred granules then were devolatilized and activated in the same manner as described in Example 1.

At the end of the process, hard granular activated carbon was obtained, with an overall yield of 34.0% by weight based on the dry coal pitch mixture. The granules had an apparent density of 0.50 gram/cc, an Iodine number of 1080, a surface area of 1040, an ash content of 2.2% by weight, and an abrasion number of 80.

Thus, the resulting granules were hard, very adsorptive, low in ash, and in all respects very much comparable to the grades of carbon preferred for use in waste water treatment and other applications. However, it is particularly noteworthy that hard granular activated carbon could not be made from this bituminous coal without subjecting the granules to the charring step described above, prior to devolatilization and activation. During the course of experimentation, granules were devolatilized without the charring step and a fused mass (instead of granules) unsuitable for activation was obtained, thus indicating the necessity and importance of the charring step.

EXAMPLE 7

DILUTE $H_3PO_4$ TREATED BITUMINOUS COAL AND PITCH TO MAKE GRANULAR ACTIVATED CARBON

The same procedure, as set forth in Example 6, was followed through the initial granulating step. At this point, 300 grams of the coal granules were loaded into a 4 liter kettle. A dilute aqueous acid solution consisting of 150 grams of 75% concentrated $H_3PO_4$ and 2850 grams of water was added to the granules (about 7.6% by weight). The mixture was heated to 80° C. and maintained at this temperature for 5 hours, while the granules were continuously stirred. The contents were allowed to cool, acid solution decanted and the coal was thoroughly washed such that the wash water off the granules analyzed to a pH of 6 to 7.

The washed coal was dried thoroughly, and then was mixed uniformly with the coal tar pitch of Example 4 in the same proportions of 90 grams coal and 10 grams pitch. The mixture was milled into 65% by weight −325 mesh powder, and was pressed into pellets of ½ inch diameter and ½ inch high using a pressure in the range of 40,000 to 80,000 psi. The bulk density of the pellets was in the range 1.1 to 1.2 grams/cc, and they were regranulated to obtain 6 × 20 mesh granules having an apparent density at this stage of 0.64 gram/cc.

The reformed granules were loaded into a cylindrical furnace and were subjected to the charring step described in Example 6, producing a 71% by weight yield and an apparent density of 0.63 gram/cc. In the course of experimentation, it was learned that, even for acid treated bituminous coal, the charring step was necessary as a pre-treating step, in order to obtain proper granular activated carbon.

The charred granules then were devolatilized and activated in the manner described in Example 1.

At the end of the activation step, hard granular activated carbon was obtained, with an overall yield of 35% by weight based on the dry coal pitch mixture. The granules had an apparent density of 0.50 gram/cc, a surface area of 1000 m²/gram, an iodine number of 1050; an ash content of 2.4% by weight, and an abrasion number of 82.

Thus, the granules were hard, very adsorptive, low in ash and in all respects very much comparable to the grades of carbon preferred for use in waste water treatment and other applications. At the same time, it is particularly noteworthy that hard granular activated carbon could not be made from this bituminous coal without subjecting the granules to the charring step described above, even though the coal had been dilute acid treated. In this regard, the result is very much unlike that for sub-bituminous coal, wherein acid treatment enables one to eliminate the charring step, while still producing an acceptable product.

Another important and notable feature was that the acid treatment of bituminous coal with dilute $H_3PO_4$ did not appear to significantly alter the yield (from 34 to 35%). In contrast, this result was very much unlike that for the sub-bituminous coal of Example 5 wherein dilute $H_3PO_4$ acid treating of the coal led to substantially improved yield from the 20 to 22% for Example 1 to the 30 to 33% of Example 5, which closely approximates the 34 and 35% yields of these last two Examples. These two results were indeed unique and unexpected in dealing with sub-bituminous coal.

The next Example represents an attempt to apply the dilute acid treating technique of the invention to lignite, which ranks lower than sub-bituminous coal.

EXAMPLE 8

DILUTE $H_3PO_4$ TREATED LIGNITE COAL (WITH PITCH) IN MAKING GRANULAR ACTIVATED CARBON

The starting material in this Example was a batch of lignite coal having the following analyses by weight:

| Proximate Analysis | | | Ultimate Analysis | | |
|---|---|---|---|---|---|
| | As Received | Dry | | As Received | Dry |
| % Moisture | 30.3 | — | % Moisture | 30.30 | — |
| % Ash | 9.9 | 14.2 | % Carbon | 41.50 | 59.5 |
| % Volatile Material | 50.0 | 71.7 | % H | 3.15 | 4.5 |
| % Fixed Carbon | 9.8 | 14.0 | % $N_2$ | 3.50 | 5.0 |
| | | | % S | 0.73 | 1.4 |
| | | | % Ash | 9.90 | 14.2 |

These analyses are, in general, typical of lignite type coals, and these coals, in general, have a high ash content compared to other coals. The as received coal was crushed to 8 × 30 mesh granules and 300 grams of these granules were loaded into a 4 liter kettle and 150 cc of concentrated $H_3PO_4$ (75%) and 2850 cc of water were added (7.6% by weight of acid). The granules and the acid solution were heated to 80° C. and maintained at this temperature for 5 hours, while the granules were continuously stirred. The contents were allowed to cool, the solution decanted, and the granules were thoroughly rinsed such that the wash water off the granules analyzed to a pH of 6 to 7. The washed granules were dried thoroughly and mixed into 10 parts per hundred of coal tar pitch of the type described in Examples 3 and 4.

This mixture was thoroughly milled such that more than 65% of the powder material passed through 325 mesh screen, preferably 75 to 85% −325 mesh. The powder was pressed into cylindrical pellets of ½ inch diameter and ⅛ inch high, using a pressure of 40,000 to 80,000 psi, the apparent density of the pellets being in the range of 1.1 to 1.2 grams/cc. The pellets were granulated to obtain 6 × 20 mesh granules having an apparent density of 0.64 to 0.66 gram/cc. The granules were loaded into a cylindrical furnace and were devolatilized as described in Example 1. Two batches of granules with identical processing were devolatilized, one with a charring step, as described in Example 1 and the other without a charring step, as described in Examples 2 to 5. The two batches were similar in regard to the overall yields and activity, indicating that the charring step is not a necessary requisite for this type of coal.

The devolatilized granules were activated as in Examples 1 to 5. The granules had very low apparent density, of 0.30 gram/cc, a surface area of 850, an Iodine number of 900, an ash content of 11.5% by weight, and an abrasion number of 30. Repeated experiments to optimize the properties, while showing some improvement, did not produce the preferred required density of 0.48 gram/cc or higher, and abrasion number of 70 or higher. Thus, an acceptable granular activated carbon which is hard and suitable for waste water applications could not be produced under the aforementioned conditions from lignite coal.

Thus, it is patently obvious from this and the foregoing Examples that:

A. Treating a bituminous coal in dilute aqueous acid solution did not materially affect the processability of the coal into hard granular carbon or the present yield of the said carbon from coal, and the dilute acid treating step did not eliminate the necessity of a charring step.

B. Treating a lignite coal in dilute aqueous acid solution did not result in an acceptable granular activated carbon where the carbon from lignite was too light and too soft.

C. In contrast, it clearly has been demonstrated in the aforesaid preferred inventive embodiments that hard granular carbons suitable for waste water and other applications can be produced from sub-bituminous coal for the first time, provided the said coal is subjected to treatment in dilute aqueous acid solution (because very hard granular activated carbon can not be produced from the untreated sub-bituminous coal), and that such treatment does result in an unexpected and hence an inventive result of high percent yield of granular activated carbon from sub-bituminous coal, where the yield is fairly comparable to that from bituminous coal, particularly comparing Example 5 with Examples 6 and 7.

D. Another indeed unexpected result of the treatment of sub-bituminous coal in dilute aqueous acid solution is that the charring step found necessary for treated and untreated bituminous coal and for untreated sub-bituminous coal can be eliminated in making hard, dense, adsorptive granular activated carbons from treated sub-bituminous coal.

The next Example is similar to Example 5, but demonstrates the effect of fineness of grind in powderizing the treated granules before compressing.

EXAMPLE 9

FINENESS OF POWDER IN USING DILUTE $H_3PO_4$ TREATED SUB-BITUMINOUS COAL (WITH PITCH) IN MAKING GRANULAR ACTIVATED CARBON

The same procedure, as set forth in Example 5, and as illustrated at the middle right in the drawing, was followed. The acid treated granules were washed with wash water, analyzed to a pH of 6 to 7 and dried thoroughly before mixing with 10 parts per hundred by weight of No. 125 coal tar pitch. Then the mixture was divided into 2 equal parts.

The first part was milled to a fine powder which was about 60 to 65% by weight −325 mesh. The powder was compacted into pellets of approximately ½ inch high and ½ inch diameter under a pressure of 40,000 to 80,000 psi, and the apparent density of the pellets was in the range of 1.1 to 1.2 gram/cc. The pellets were granulated, to 6 by 20 mesh and the density of the granules was 0.64 to 0.66 gram/cc. The granules were devolatilized as in Example 5 and the density of granules was 0.57 to 0.59 gram/cc. These granules were activated as described in earlier Examples 1, 2 and 5, and these activated granules had a density of 0.44 to 0.47 gram/cc, an Iodine number of 1000 to 1100, a surface area of 900 to 1050 m²/gram, ash content of 5 to 6% by weight and an abrasion number of 55 to 65. Thus, these granules are considerably softer and hence are not too suitable for use in water and waste water treatment and in other applications, because of possible excessive loss of material in use and regeneration when the granules are not very hard.

The second part was milled to a very fine powder such that it had a particle size of more than 65% by weight −325 mesh, i.e., 75 to 85% by weight −325 mesh. The powder was compacted, as above, to a pellet density of 1.1 to 1.2 grams/cc; the pellets were granulated and had a density of 0.65 to 0.68 gram/cc. The granules were devolatilized as in Example 5 and the density of granules was 0.60 to 0.62 gram/cc. The granules were activated, as above, and the apparent density of the activated granules was 0.48 to 0.50 gram/cc. The granules had an Iodine number of 1000 to 1100, surface area of 900 to 1050 $m^2$/gram, ash content of 5 to 6% by weight and an abrasion number of 80.

Since the granules were subjected otherwise to identical processing conditions in part 1 and part 2, it is believed that the finer grinding of the treated sub-bituminous coal granules (75 to 85% −325 mesh) resulted in compact granules and hence a hard granular product. In contrast, as described in Examples 6 and 7, grinding the bituminous coal to 65% by weight −325 mesh resulted in a hard granular product.

Thus, the fineness of the grind prior to compaction, forms a preferred embodiment of the present invention.

The next Example represents the workability of HCl as the dilute aqueous acid in the inventive technique.

EXAMPLE 10

DILUTE HCL TREATED SUB-BITUMINOUS COAL (WITHOUT AND WITH PITCH) IN MAKING GRANULAR ACTIVATED CARBON

A batch of Wyoming sub-bituminous coal having the typical analyses described in Example 1 was crushed and screened to obtain 8 × 30 granules. 300 grams of the granules were loaded into a 4 liter kettle and a dilute aqueous acid solution consisting of 300 cc of 37.5% concentrated HCl and 2700 cc of water was added to the granules (about 11% by weight). The granules and the acid solution were heated to 80° C. and maintained at this temperature for 5 hours, while the granules were continuously stirred.

The contents of the kettle were allowed to cool, the solution decanted and the granules thoroughly rinsed such that the waste water off the granules analyzed to a pH of 6 to 7. The granules were dried either: (A) to 15% moisture, where further processed without a carbonaceous binder, as in Examples 2 and 3, to a granular activated carbon product, or (B) thoroughly, where 10 parts per hundred of pitch were added and processed as in Examples 4 and 5.

The partially dried coal granules and the thoroughly dried ganular coal pitch mixture were milled to a very fine size, such that more than 65% of the material passed through 325 mesh, preferably 75 to 85% of material passed through 325 mesh. The powder was pressed into cylindrical pellets of ½ inch diameter and ½ inch high using pressure of 40,000 to 80,000 psi; the apparent density of the pellets being in the range 1.1 to 1.2 grams/cc. These pellets were regranulated to 6 × 20 mesh having an apparent density of 0.60 to 0.65 gram/cc, and these granules were devolatilized, without charring, and activated, as in Examples 2 to 5.

(A) The resulting overall yield of granular activated carbon, based on dry coal (pitchless), was 25 to 28% by weight. The granules had a surface area of 900 to 1100 $m^2$/gram, an Iodine number of 1000 to 1100, an ash content of 5 to 7% by weight, an abrasion number of 70 and an apparent density of 0.46 gram/cc. Compared to Example 1, the yield, adsorption and abrasion resistance were significantly increased, while the ash content was significantly decreased. Compared to Examples 2 and 3, the yield and other properties were comparable to Example 2 ($H_2SO_4$), while the yield and apparent density were slightly less than for Example 3 ($H_3PO_4$).

(B) The resulting overall yield of granular activated carbon, based on the dry coal pitch mixture, was 25 to 30% by weight, and the granules had a surface area of 900 to 1100 $m^2$/gram, an Iodine number of 1000 to 1100, an ash content of 5 to 7% by weight, an abrasion number of 80, and an apparent density of 0.48 gram/cc. Compared to Example 1, the yield, abrasion number and apparent density were significantly increased. As compared to Examples 2 and 3 and (A) above (pitchless), the abrasion resistance was significantly increased, and the yield and apparent density were slightly increased over Example 2 and (A) above. As compared to Examples 4 and 5, the yield was slightly less than for Example 4 ($H_2SO_4$ with pitch), and significantly less than for Example 5 ($H_3PO_4$ with pitch).

However, in each of (A) and (B) above, as compared to Example 1, treating the sub-bituminous coal with a dilute aqueous solution of HCl resulted in higher yield and improved adsorption, greater abrasion resistance and higher purity, making such inventive product suitable for use in waste water treatment and other applications, while at the same time eliminating the need for the charring step.

The next Example demonstrates the beneficial effect of dilute acid treatment in converting volatile carbon containing material in sub-bituminous coal to a non-volatile or cross-linked state.

EXAMPLE 11

BENEFICIAL EFFECT OF DILUTE ACID TREATMENT ON SUB-BITUMINOUS COAL IN MAKING GRANULAR ACTIVATED CARBON

Proximate analyses were obtained of the sub-bituminous granules, following acid treatment thereof in accordance with Examples 2-5 and 10, in order to compare with the proximate analysis of the starting coal used in such Examples. In each instance, the following proximate analyses were obtained subsequent to the dilute acid treatment, following the washing off the acid and drying steps, with the drying being carried out to the moisture content indicated in the TABLE below in the "AS RECEIVED" columns. For convenience of comparison, the proximate analysis of the coal in Example 1 is reproduced in the TABLE below, and the "DRY" figures were calculated from the "AS RECEIVED" figures to provide uniform moisture-free basis for comparison.

| TABLE OF PROXIMATE ANALYSES BY WEIGHT % | | | |
|---|---|---|---|
| | Starting | Acid Treatment | |
| As Received | Coal | $H_2SO_4$ | $H_3PO_4$ | HCl |
| Moisture | 17 | 5 | 1.44 | 6.12 |
| Volatile Material | 44 | 45.15 | 42.54 | 44.36 |
| Ash | 2.05 | 1.94 | 2.82 | 2.04 |
| Fixed Carbon | 35 | 47.91 | 53.21 | 47.48 |
| Dry | | | | |
| Volatile Material | 53 | 47.53 | 43.16 | 47.19 |
| Ash | 2.48 | 2.04 | 2.86 | 2.17 |

-continued

TABLE OF PROXIMATE ANALYSES BY WEIGHT %

| As Received | Starting Coal | Acid Treatment | | |
|---|---|---|---|---|
| | | $H_2SO_4$ | $H_3PO_4$ | HCl |
| Fixed Carbon | 42.20 | 50.43 | 53.99 | 50.51 |

The above TABLE shows that even on an "AS RECEIVED" basis, each acid treatment produced a substantial increase in fixed carbon content, and that on a moisture free or "DRY" basis, which is the only uniform basis for comparison, each acid treatment produced not only a substantial increase in fixed carbon content but also a decrease in volatile matter content, thereby indicating a substantial conversion of the volatile carbon containing components to a non-volatile fixed carbon state. The above TABLE also shows that on such "DRY" basis, no substantial reduction in ash content occurred because of any of the three types of dilute acid treatment, and that $H_3PO_4$ treatment actually resulted in a slight increase in ash content, which could be a result of the variability of the materials and test methods. However, when comparing $H_3PO_4$ treatment with $H_2SO_4$ and HCl treatment, the former produced significantly better results in volatile matter content reduction and fixed carbon content increase on both "AS RECEIVED" and "DRY" bases, and hence such $H_3PO_4$ treatment is that preferred.

In summary, such acid treatment is essential in order to enhance the "age" of the sub-bituminous coal by a chemical reaction which converts the resinous and other carbon containing components (viz. coal tars) from a volatile to a non-volatile state, also referred to as cross-linking. Thus, by reason of such conversion, during devolatilization there is formed a cross-linked carbon residue well suited to produce activated carbon, resulting in a doubly unexpected advantage of higher yield and activity. This is evident from the previously noted comparisons of the results obtained by inventive Examples 2-5 and 10 with those of Example 1 (no acid treatment). Furthermore, it is apparent from the above TABLE that any removal of ash content that may be obtained by the inventive dilute acid treating is secondary to its primary cross-linking function.

The next Example shows the applicability of the inventive process to a larger scale operation.

EXAMPLE 12

DILUTE $H_3PO_4$ TREATED SUB-BITUMINOUS COAL GRANULES (WITH PITCH) IN MAKING GRANULAR ACTIVATED CARBON ON A LARGER SCALE

A batch of Wyoming sub-bituminous coal, obtained in car loads, and having the average analyses described in Example 1 was crushed and screened to obtain 8 × 30 granules. A dilute aqueous acid solution containing 60 lbs of 85% $H_3PO_4$ and 300 gallons (1 gal. = 8.4 lbs.) of water was loaded in a large acid treatment tank (about 2.3% by weight). To this, 1500 lbs. of as received coal granules were added. The granules and acid solution were heated to 180°-200° F. (82°-93° C.) and maintained at this temperature for 1 hour while being stirred. Then the contents of the slurry were piped to a wash station where the acid solution was drained and the coal was subsequently washed to a pH of 6. This Example illustrates that the acid concentration can be lowered substantially below those employed in Examples 2-5 and 9-11. Thus a more preferred acid concentration is from about 2 to about 5% for producing hard granular activated carbon especially suited for water and waste water treatment applications.

The washed coal then was dried to a moisture content of about 5 to about 10% by weight in a rotary kiln at 300°-325° F. (149°-163° C.) in a gentle concurrent stream of inert gas to avoid reaction with air in the kiln. The dried coal granules were mixed with the coal tar pitch of Example 4 in the ratio of 90 parts coal and 10 parts pitch, and the two were fed together into a bowl mill where the material was ground to a fine powder or dust which analyzed to 60-65% −325 mesh. This coal pitch mixture was fed into a compactor where it was compacted continuously between grooved rollers (manufactured by The Fitzpatrick Company, Elmhurst, Ill.) at an applied hydraulic pressure of about 2,300 psi in the cylinder, or 10,000 pounds load per linear inch applied to the rollers. This produced thin (about ¼ inch thick) sheets of corrugated cross-section, which then were crushed in a rotary mill to form 6/20 mesh granules. The oversized granules were regranulated and again screened while the undersized granules were recompacted, and this continuous compressing and recycling is believed to contribute to the hardness of the reformed granules. The compacted and reformed granules had an apparent density of 0.65 to 0.68 gram/cc.

The reformed granules then were devolatilized (without a charring step) in an indirect fired rotary kiln in a gentle counter-current stream of inert gas with the temperature of the kiln increasing slowly from 300° F. (150° C.) at the feed end to 1000° F. (538° C.) at the exit end, and the total residence time was between 1 and 2 hours. Thus, the heating rate was about 100° C. to about 500° C. per hour. The apparent density of the devolatilized granules was 0.61 to 0.63 gram/cc and the yield during devolatilization was 60-63%.

The devolatilized granules next were fed into the top of a vertical multiple (8) hearth Herreshoff furnace wherein the granules were slowly activated and discharged from the bottom hearth, with the temperature ranging from about 600° C. at the top hearth to about 1000° C. at the bottom hearth for a total residence time of about 6 hours, at a heating rate of about 100° C. to about 1000° C. per hour. The atmosphere employed contained the combustion products of natural gas and air and steam. The product yield through the multiple hearth furnace was approximately 50%, based on devolatilized granules, for an overall yield of about 30%, based on dry coal pitch mixture.

The discharged granules were screened, and samples then taken from eighteen (18) different runs or lots were analyzed, with the following results.

| Property | Low | High | Average |
|---|---|---|---|
| Iodine Number | 964 | 1030 | 1000 |
| Molasses Number | 215 | 255 | 240 |
| Abrasion Number | 75 | 88 | 80 |
| Apparent Density (gm/cc) | 0.47 | 0.52 | 0.49 |
| Mean Particle Diameter (mm) | 1.61 | 1.80 | 1.67 |
| Moisture Content (% by weight) | 0.25 | 3.0 | 1.0 |

A carbon of this type is very hard (as measured by abrasion number in the preferred range of 75-88 with an average of 80), adsorptive (as measured by the high Iodine and Molasses numbers), making it extremely well suited for use in industrial and municipal water purification use, inasmuch as the yield, activity and other properties are comparable to both inventive Example 5 and Bituminous Examples 6 and 7.

This Example shows not only the workability of the inventive process on scale up, but also the production of an acceptable granular activated carbon wherein the fineness of grind need not necessarily be limited to more than 65% by weight −325 mesh, even though such degree for powder fineness is preferred, as stated in Example 9 above, for a hard product. It is believed that the continuous compacting and recycling of the fines were sufficient for obtaining the desired hardness level, as measured by an abrasion number ranging from 75 to 88, with an average of 80. Hence, the feature of such continuous compacting and recycling of fines also constitutes a preferred embodiment of the invention.

EXAMPLE 13

The large scale procedure of Example 12 essentially was repeated, the only significant difference being the extent of the drying step of the acid treatment operation. In one instance (A), 13,000 pounds of granular activated carbon was produced wherein the drying was carried out to about 5 to about 10% by weight moisture content. In another instance (B) the drying was carried out to about 10 to about 15% by weight moisture content, and in the third instance (C), the drying was carried out to greater than 15% by weight moisture content. The average properties of the granular activated carbon in each instance are listed in the TABLE below.

TABLE

| | A | B | C |
|---|---|---|---|
| Surface Area (m²/gm) | | | |
| Iodine Number | 970 | 960 | 1000 |
| Ash Content (% by weight) | 7.2 | 7.1 | 8.2 |
| Abrasion Number | 82 | 80 | 88 |
| Apparent Density (gm/cc) | 0.5 | 0.5 | 0.5 |
| Molasses Number | 233 | 243 | 290 |
| Mean Particle Diameter (mm) | 1.51 | 1.46 | 1.75 |

This Example clearly demonstrates that in scale-up it is not necessary to carry out the drying, when using a carbonaceous binder such as pitch, to such a thorough extent that only about 1 or about 2% moisture remain. Rather, as long as the drying is carried out to a moisture content of below about 25% by weight, this is quite sufficient. One reason for this is that in the scaled-up version of the process, some further drying of the treated granules occurs during milling on a large scale, in view of the significant generation of heat. Hence, what was formerly thought to be necessary, i.e., drying thoroughly to not more than about 5% moisture, and preferably about 1 or 2% by weight in the drying step, is not necessary to the successful practice of the process, because of significant generation of heat in the milling of the coal in the scale-up portion of the process.

The next and last Example illustrates the workability of the inventive process in effectively producing a gas phase hard granular activated carbon.

EXAMPLE 14

DILUTE $H_3PO_4$ TREATED SUB-BITUMINOUS COAL GRANULES (WITH HIGHER CONCENTRATION OF ACID AND PITCH) IN MAKING GRANULAR ACTIVATED CARBON ESPECIALLY SUITED FOR GAS AND AIR PURIFICATION

The procedure of Example 5 was repeated with the only principal following differences being the use of about 15% by weight concentration of acid instead of about 8.1%; the drying of the acid washed granules to about 5% by weight moisture content instead of about 1 or 2%; the compression of the powdered pitch mixture under 40,000–60,000 psi; the heating at 150° C. per hour to 450° C. instead of at 300° C. per hour, and the activating at 870° C. for 2 hours instead of for 4 to 5 hours.

The properties of the resulting hard granular activated carbon, representing an average of eight runs were: Iodine number 1170, Abrasion number 90, apparent density 0.47 gram/cc, Molasses number 195, and carbon tetrachloride number 65. Hence, the product was well suited for gas and air purification applications.

From the foregoing inventive Examples 2–5 and 9–14 it will be seen that the present invention is unique in providing for the first time a process for producing hard granular activated carbons from sub-bituminous coals by directly devolatilizing the acid treated compacted coal granules, either with or without pitch, whereby the traditional step of charring is eliminated. A further inventive aspect of the inventive process is the discovery that a variety of granular carbons having predetermined physical properties can be produced by changing the concentration of the acid used in the acid treating step.

In accordance with the inventive process hard granular activated carbons suited for water and waste water applications may be produced by employing lower acid concentrations from about 1 to about 10% by weight, preferably from about 2 to about 5% weight for significant material reduction cost, where the preferred properties are about 900 minimum Iodine number and about 200 minimum Molasses number, more preferably about 950 Iodine number and about 300 Molasses number or higher, and an Abrasion number of about 70 or higher.

To produce hard granular activated carbons suited for gas and air purifications, the inventive process employs relatively higher acid concentrations for the acid treatment; i.e., from 10 to about 25% by weight, preferably from 10% to about 20% by weight, where the preferred properties are about 1000 minimum Iodine number and very low Molasses number, i.e., less than about 200, preferably about 1050 Iodine number and Molasses number of about 180.

While the foregoing specific examples described in this application have been in connection with dilute $H_2SO_4$, $H_3PO_4$ and HCl, it is to be understood that, even though $H_3PO_4$ is the preferred acid, any suitable dilute inorganic acid may be used for the acid treatment described herein, including $HNO_3$ and other oxy acids of Sulphur, Phosphorous, Chlorine and Nitrogen, and mixtures thereof.

The term "acid leaching" traditionally refers to removal of material, such as ash constituents, from coal, and usually employs relatively concentrated acids. In contrast to such traditional acid leaching, the present process deals with chemical treatment of the coal with dilute acids to make the coal suitable for producing hard granular activated carbon. For purposes of clarity, the term "acid leaching" has been removed from this disclosure and claims, and replaced by the term "acid treatment".

It now is seen how the invention accomplishes its various objectives. Likewise, it is to be understood that while the invention has been described and illustrated herein by reference to certain preferred embodiments, the same are to be considered as illustrative, rather than as limiting.

What is claimed is:

1. A process for making hard granular activated carbon having a minimum abrasion number of about 70 comprising:
   forming granules from sub-bituminous coal;
   treating the granules with a dilute aqueous solution of inorganic acid at a concentration from about 1 to about 25% by weight to reduce the volatile content and thereby increase the fixed carbon content comprising: mixing the granules with the acid for a time and at a temperature and solution to coal ratio sufficient to eliminate subsequent charring, washing off the acid, and drying the granules at least partially to a moisture content below about 25% by weight;
   mixing the treated granules with 0% to about 15% by weight of a carbonaceous binder;
   reducing the treated granules to form fine powder;
   compressing the powder to form shapes;
   reducing the shapes to reform granules;
   devolatilizing the reformed granules, without charring, by directly heating to and at a temperature higher than the charring temperature in an oxygen-free atmosphere; and
   activating the devolatilized granules by heating to and at a temperature higher than the devolatilizing temperature in an atmosphere containing a gaseous activating agent.

2. Hard granular activated carbon made by the process of claim 1.

3. The process of claim 1 wherein the coal has a moisture content of not more than about 25% by weight and an ash content of not more than about 5% by weight.

4. The process of claim 1 wherein the overall yield of granular activated carbon is not less than about 25% by weight, dry basis.

5. The process of claim 1 wherein the acid is $H_3PO_4$, and the overall yield is not less than about 26% by weight, dry basis.

6. The process of claim 1 wherein the acid concentration is from 10 to about 25% by weight, the acid concentration being selected to provide a minimum iodine number of about 1000 and a molasses number below about 200.

7. Hard granular activated carbon made by the process of claim 6 and suitable for use in gas and air purification applications and having a minimum carbon tetrachloride number of about 50.

8. The process of claim 6 wherein the acid concentration is from 10 to about 20% by weight.

9. The process of claim 1 wherein the acid concentration is from about 1 to about 10% by weight, the acid concentration being selected to provide a minimum iodine number of about 900 and a minimum molasses number of about 200.

10. Hard granular activated carbon made by the process of claim 9 and suitable for use in water and waste water treatment.

11. The process of claim 9 wherein the acid concentration is from about 2 to about 5% by weight.

12. The process of claim 1 wherein the powder is not less than about 60% −325 mesh.

13. The process of claim 1 wherein the powder is more than about 65% −325 mesh.

14. The process of claim 1 wherein the powder is compressed to form shapes under a pressure of about 40,000 psi or more.

15. The process of claim 1 wherein the powder is continually compressed to form shapes and the fines are recycled.

16. The process of claim 1 wherein during devolatilization the heating rate is about 50° C. to about 300° C. per hour, the temperature is about 400° C. to about 600° C., and the time is about ½ hour to about 3 hours.

17. The process of claim 1 wherein during activation the heating rate is about 100° C. to about 1000° C. per hour, the temperature is about 600° C. to about 1000° C., and the time is about 1 hour to about 6 hours.

18. The proces of claim 1 wherein said granules after being washed to remove the acid are dried to a moisture content below about 25% by weight and thereafter mixed with about 5 to about 15% by weight of a carbonaceous binder.

19. Hard granular activated carbon made by the process of claim 18 and having an abrasion number of at least 70.

20. The process of claim 18 wherein the acid is $H_3PO_4$, and the overall yield of granular activated carbon is not less than about 30% by weight, dry coal binder mixture basis.

21. The process of claim 18 wherein the powder is more than about 65% −325 mesh, and is compressed to form shapes under a pressure of about 40,000 psi or more.

22. Hard granular activated carbon made by the process of claim 21 and having an abrasion number of not less than about 80.

23. The process of claim 18 wherein the powder is not less than about 60% −325 mesh, and is continuously compressed to form shapes and the fines are recycled.

24. Hard granular activated carbon made by the process of claim 23 and having an abrasion number of not less than about 75.

25. The process of claim 1 wherein said granules after being washed to remove the acid are partially dried to a moisture content of about 10 to about 25% by weight, with 0% addition of a carbonaceous binder.

26. Hard granular activated carbon made by the process of claim 25 and having a surface area of not less than about 900 m²/gram, and an iodine number of not less than about 1000.

27. The process of claim 25 wherein the acid is $H_3PO_4$, and the overall yield of granular activated carbon is not less than about 26% by weight, dry coal basis.

* * * * *